Figure 1:
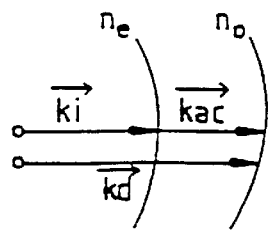

United States Patent [19]

Tournois

[11] Patent Number: 6,072,813
[45] Date of Patent: Jun. 6, 2000

[54] DEVICE FOR CONTROLLING LIGHT PULSES BY A PROGRAMMABLE ACOUSTOOPTIC DEVICE

[75] Inventor: Pierre Tournois, Paris, France

[73] Assignee: Thomson-CSF, Paris, France

[21] Appl. No.: 09/029,065

[22] PCT Filed: Jul. 4, 1997

[86] PCT No.: PCT/FR97/01206

§ 371 Date: Mar. 2, 1998

§ 102(e) Date: Mar. 2, 1998

[87] PCT Pub. No.: WO98/01788

PCT Pub. Date: Jan. 15, 1998

[30] Foreign Application Priority Data

Jul. 9, 1996 [FR] France ................................... 96 08510
Sep. 3, 1996 [FR] France ................................... 96 10717

[51] Int. Cl.[7] ................................. H01S 3/10; G02F 1/11
[52] U.S. Cl. ........................... 372/25; 359/285; 359/305; 372/13; 372/26; 385/7
[58] Field of Search ................................. 385/7; 372/13, 372/27, 25, 26, 28, 102; 359/285–287, 305–308, 310

[56] References Cited

U.S. PATENT DOCUMENTS

| | | | |
|---|---|---|---|
| 3,435,381 | 3/1969 | Tournois | 333/145 |
| 3,464,033 | 8/1969 | Tournois | 333/150 |
| 3,551,034 | 12/1970 | Tournois | 367/140 |
| 3,605,043 | 9/1971 | Bienvenu et al. | 333/145 |
| 3,719,906 | 3/1973 | Tournois | 333/142 |
| 3,764,928 | 10/1973 | Gires et al. | 330/5.5 |
| 3,862,413 | 1/1975 | Brienza | 359/181 |
| 3,962,673 | 6/1976 | Dedbois et al. | 367/7 |
| 4,099,206 | 7/1978 | Desbois et al. | 348/198 |
| 4,128,615 | 12/1978 | Tournois et al. | 310/313 B |
| 4,134,623 | 1/1979 | Tournois et al. | 310/313 B |
| 4,146,783 | 3/1979 | Desbois et al. | 359/130 |
| 4,159,539 | 6/1979 | Tournois et al. | 365/157 |
| 4,344,675 | 8/1982 | Yao | 359/310 X |
| 4,403,311 | 9/1983 | Tournois | 367/11 |
| 4,540,245 | 9/1985 | Bademian | 359/311 |
| 4,961,209 | 10/1990 | Rowlands et al. | 378/29 |
| 5,499,134 | 3/1996 | Almantas et al. | |

OTHER PUBLICATIONS

Fermann M E et al: "Shaping of ultrashort optical pulses by using an integrated ocousto–optic tunable filter", Optics Letters, vol. 18, No. 18, Sep. 15, 1993, pp. 1505–1507.

Maine P et al: "Generation of ultrahigh peak power pulses by chirped pulse amplification",IEEE Journal of Quantum Electronics, vol. 24, No. 2, Feb. 1988, pp. 398–403.

Schweicher E et al: "Acoustic–optical signal processing and intergrated optics", Revue HF, vol. 14, No. 3–4, 1988, pp. 88–122, [No Month].

Tournois P: "Acousto–optic programmable dispersive filter for adaptive compensation of group delay time dispersion in laser systems", Optics Communications, Aug. 1, 1997, vol. 140, No. 4–6, pp. 245–249.

*Primary Examiner*—John D. Lee
*Attorney, Agent, or Firm*—Oblon, Spivak, McClelland, Maier & Neustadt, P.C.

[57] ABSTRACT

A programmable acoustooptic device including an elastooptic medium configured to receive an input optical pulse and an acoustic wave; an acoustic transducer configured to generate the acoustic wave in the elastooptic medium along a defined direction; and a programmable circuit coupled to the acoustic transducer and configured to program at least one of a frequency modulation and phase modulation of the acoustic wave, whereby the acoustic transducer generates a modulated acoustic wave, wherein an output optical pulse is generated and is a convolution of the input optical pulse with the modulated acoustic signal.

18 Claims, 4 Drawing Sheets

DEVICE FOR CONTROLLING LIGHT PULSES BY A PROGRAMMABLE ACOUSTOOPTIC DEVICE

The invention relates to a device for controlling light pulses by a programmable acoustooptic device and its application to pulse-processing devices and in particular to a laser source delivering ultrashort pulses.

Devices employing the interaction of acoustic devices on the behaviour of optical signals are known in the art.

Considering an acoustic medium, and in particular an anisotropic elastooptic medium into which an acoustic wave is introduced, this having the effect of inducing optical index variations in this medium, and if an optical wave colinear with the direction of propagation of the acoustic wave is introduced into this medium, there is an interaction between the acoustic wave and the optical wave. This interaction is due to the index variations on the optical wave. If the optical wave and the acoustic wave are colinear, there is a coupling of a diffracted optical wave κd to an incident optical wave κi via an acoustic wave κac, as shown in FIG. 1, in which $\vec{k\,d} = \vec{k\,i} + \vec{ka\,c}$.

This acoustooptic interaction couples the incident optical wave of wavenumber $\beta_1$ to the diffracted optical wave of wavenumber $\beta_2$ via an acoustic wave of wavenumber K in an anisotropic elastooptic material.

Letting $\Delta\beta = \beta_1 - \beta_2 \pm K$ (1)

the amplitude $A_2(z)$ of the electric field $E_2$ of the diffracted optical wave is coupled to the amplitude $A_1(z)$ of the electric field $E_1$ of the incident optical wave by the equations:

$$\begin{cases} \frac{\partial}{\partial z} A_1 = -i\kappa A_2 e^{i(\Delta\beta)z} \\ \frac{\partial}{\partial Z} A_2 = -i\kappa^* A_1 e^{-i(\Delta\beta)z} \end{cases} \quad (2)$$

κ being the coupling constant.

The solutions of equations (2) may be written, for $A_2(0)=0$, as:

$$\begin{cases} A_1(z) = A_1(0) e^{i\frac{\Delta\beta}{2}z} \left[ \cos sz - i\frac{\Delta\beta}{2s} \sin sz \right] \\ A_2(z) = )i\frac{\kappa^*}{s} A_1(0) e^{-i\frac{\Delta\beta}{2}z} \sin sz \end{cases} \quad (3)$$

with:

$$|\kappa|^2 = \frac{\omega^2}{16 c^2}(n_1 n_2)^3 p^2 S^2 \quad (4)$$

$$I_{ac} = \frac{1}{2}\rho v^3 S^2$$

$$S^2 = |\kappa|^2 + \left(\frac{1}{2}\Delta\beta\right)^2$$

ω being the optical angular frequency,
c being the velocity of light in vacuo,
$n_1$ and $n_2$ being the optical indices associated respectively with the incident wave and the diffracted wave,
p being the elastooptical constant,
S being the acoustic stress κ being the coupling constant,
ρ being the density of the material,
v being the acoustic velocity and $I_{ac}$ being the acoustic intensity.

At a distance Z, the fraction of energy transferred from $A_1$ to $A_2$ is:

$$T = \frac{|A_2(Z)|^2}{|A_1(0)|^2} = \frac{|\kappa|^2}{|\kappa|^2 + \left(\frac{\Delta\beta}{2}\right)^2} \sin^2\left[|\kappa|^2 + \left(\frac{\Delta\beta}{2}\right)^2\right]^{1/2} \cdot z \quad (5)$$

All of the energy of the incident wave is transferred to a diffracted wave at a distance $L_c$, called the coupling length when:

$$\begin{cases} \Delta\beta = 0 \to \beta_1 = \beta_2 \pm K \\ |\kappa| \cdot L_c = \pi/2 \end{cases} \quad (6)$$

If the incident optical wave carries a signal $s_i(t)$ and the acoustic coupling wave carries a signal $a(t)$, the diffracted optical wave in a colinear interaction will carry the signal in the form;

$$s_d(t) = s_i(t) * a(t)$$

representing the convolution of the signals $s_i(t)$ and $a(t)$.

The signal $s_d(t)$ is the result of the filtering of $s_i(t)$ by an impulse response filtering $a(t)$.

In particular, if the signal $s_i(t)$ is a very short optical pulse and the signal $a(t)$ is a long amplitude-modulated or frequency-modulated acoustic pulse of BT (bandwidth× time) product, the signal $s_d(t)$ will be a long amplitude-modulated or frequency-modulated optical pulse having the same BT product faithfully copying the code of the acoustic wave such that $\Delta\beta = 0$:

$$f_{opt} = \frac{c}{v} \cdot \frac{f_{ac}}{|n_2 - n_1|}$$

$$B_{opt} = \frac{c}{v \cdot |n_2 - n_1|} B_{ac}$$

$$B_{opt} \cdot T_{opt} = B_{ac} \cdot T_{ac}$$

$f_{opt}$ being the optical frequency,
$f_{ac}$ being the acoustic frequency
$B_{opt}$ being the optical bandwidth and
$B_{ac}$ being the acoustic band.

In frequency-modulated light-pulse amplification arrangements known as CPA (Chirp Pulse Amplification), the problem consists in generating, from a very short optical pulse, a long frequency-modulated optical signal which will be recompressed after laser amplification.

The compression device subjected to high-peak powers cannot be programmed. It is therefore desirable for the expansion device, which operates with a small optical signal, to be made programmable depending on the defects and instabilities in the laser amplification chain.

This is because, when the expansion device is perfectly matched to the compression device in the absence of a laser amplification chain, the recompressed signal is virtually identical to the very short initial optical signal before expansion. However, in the presence of the amplification chain, which distorts the signals, the recompressed signal is not identical to the initial signal even when the expander and the compressor are perfectly matched.

The only way of compensating for defects in the amplification and in the compression is to use a programmable expansion filter.

The invention therefore relates to a programmable acoustooptic device comprising an elastooptic medium provided with an acoustic transducer capable of generating a modulated acoustic wave in the elastooptic medium along a defined direction, together with means for coupling a polarized incident optical wave in the elastooptic medium. In addition, the device includes a circuit for programming the modulation of the acoustic wave.

The invention is applicable to a laser source delivering ultrashort pulses. This is because the amplification of a light pulse comes up against the limitations of the amplifying medium.

The invention therefore relates to a laser course comprising an acoustooptic device as described above, in which the acoustooptic device receives a polarized incident optical pulse to be amplified and delivers an expanded optical pulse. This device includes an optical amplifier which amplifies the expanded optical pulse, and an optical compression device which compresses the expanded and then amplified optical pulse.

In a cavity oscillator, the mirrors which close off this cavity introduce frequency dispersions of the optical signal. In order to alleviate this drawback, the invention provides for a programmable acoustooptic device as described to be inserted into the optical cavity.

Figure 2A:
Figure 2B:
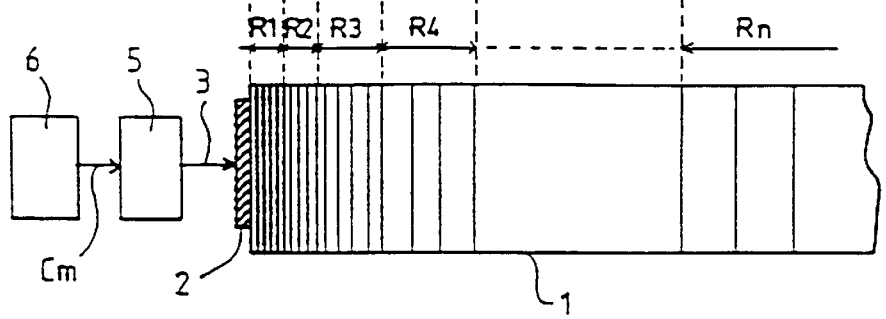
Figure 2C:
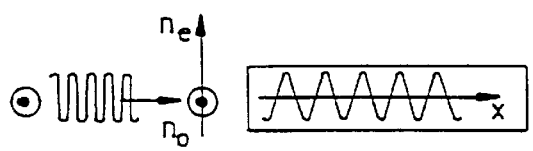
Figure 3A:
Figure 3B:
Figure 5A:
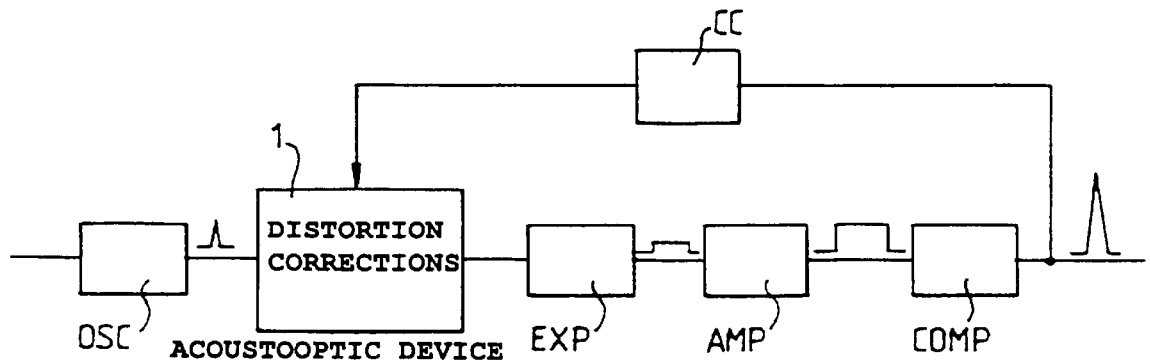
Figure 5B:
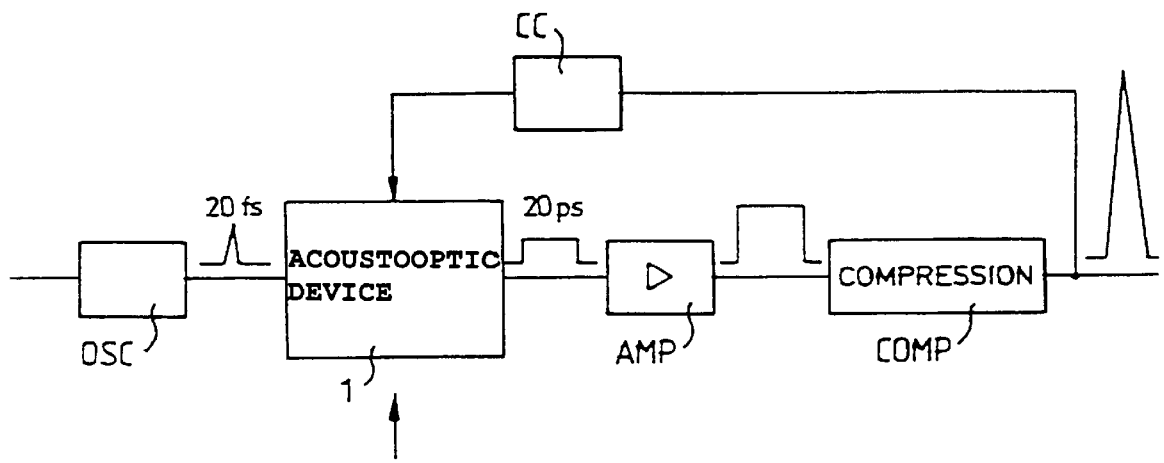
Figure 6:
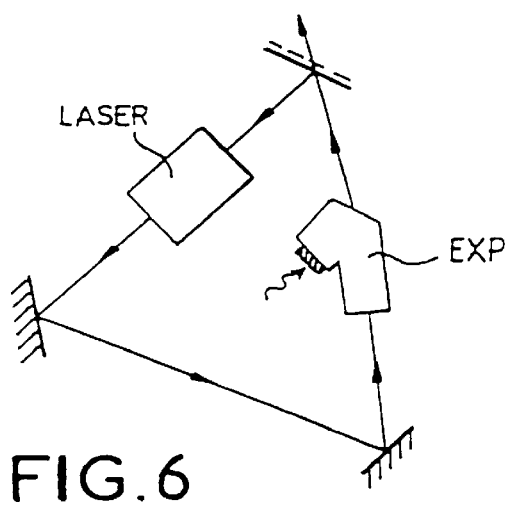

The various objects and characteristics of the invention will appear more clearly in the description which follows and in the appended figures which represent:

FIG. 1, a diagram of the optical and acoustic waves which interfere in the acoustic medium;

FIGS. 2a to 2c, an illustrative embodiment of the specification of the invention;

FIGS. 3a and 3b, examples of expanded optical signals obtained using the system of the invention;

FIGS. 4a to 4e, illustrative embodiments of the acoustooptic expansion device according to the invention;

FIGS. 5a and 5b, examples of the application of the invention to laser architectures generating an ultrashort pulse;

FIG. 6, an example of the application of the invention to a cavity oscillator.

The device of the invention includes an elastooptic cell 1 having a piezoelectric transducer or electrode 2 to which is applied an electrical signal 3 which induces an acoustic wave a(t) in the transducer 1. This signal is frequency-modulated by a succession of modulation frequencies or by a continuously-variable frequency modulation. Such a signal is shown in FIG. 2a.

An acoustic wave a(t) having the same frequency modulations therefore propagates in the transducer and induces index variations constituting various gratings (R1, R2, R3, . . . , Rn), the spacings of which correspond to the modulation frequencies. Thus, in FIG. 2b, a grating R1 corresponds to a modulation frequency f1, the grating R2 corresponds to a modulation frequency f2, the grating R3 corresponds to a modulation frequency f3, etc.

The transducer also receives a linearly polarized optical wave, being in the form of a pulse of short duration and consisting of various frequencies. Means for coupling the optical wave in the elastooptic medium will be described later.

The elastooptic medium is a birefringent material.

The frequencies of modulation of the optical wave are such that each frequency in the light pulse diffracts on a grating (R1, R2, R3, . . . Rn) or on part of a grating.

This diffraction has the effect of causing the light wave to undergo a polarization mode conversion. For example, a TM polarized wave is converted into a TE wave.

Since the material of the elastooptic medium 1 is birefringent and the light pulse is TM polarized (for example) the TM polarization of the pulse is converted into the TE polarization by the first grating R1 at the frequency f1; the TM polarization is converted into the TE polarization by the grating R2 at the frequency f2, and so on.

The cell is oriented in such a way that the incident light pulse has its TM polarization oriented along an axis z for which the optical index is the extraordinary index $n_e$ of the acoustooptic medium. Each diffracted optical wave is polarized along an axis for which the optical index is the ordinary index $n_o$. As is known, the velocities of propagation of the waves are different for the indices $n_e$ and $n_o$.

Considering various frequencies of the optical pulse, f1, f2, . . . , fn:

at the frequency f1, the wave undergoes a polarization conversion at the grating R1 and travels the length of the transducer at the velocity $v_o$ corresponding to the index $n_o$, etc., at the frequency $f_n$, the wave travels through the transducer at the velocity $v_e$, apart from the grating $R_n$, by which is diffracted.

It may therefore be seen that the various frequencies in the optical wave travel the length of the transducer at different average velocities.

On exiting the transducer, the various light waves at the various frequencies are distributed over time.

The light pulse is therefore spread out over time. The energy of a pulse of short duration is distributed within an optical pulse of long duration.

The signal 3 applied to the electrode of the piezoelectric transducer is a frequency-modulated electrical signal with a variation over time of the modulation frequency. The signal is delivered by a modulation circuit 5 driven by a modulation drive signal Cm (circuit 6) which defines the modulation law. For example, the signal Cm may be a signal having a linear variation and it causes a linear variation over time of the modulation frequency. The various gratings R1 and Rn will then vary continuously.

According to the invention, it is important to control, as required, the waveform of the drive signal Cm. This allows the variation over time of the modulation frequency to be programmed. There will then be gratings of different lengths and it will be possible to have an expanded optical output pulse having a suitable waveform of the type, for example, shown in FIG. 3a. It will also be possible to have an expanded pulse whose distribution of frequencies is chosen depending on the programming (see in FIG. 3b, for example).

The acoustooptic device described therefore allows a light pulse to be expanded in a programmable manner.

As represented symbolically in FIG. 2c, the acoustooptic medium receives an input optical wave ($\omega_i$, $k_i$) and interferes with an index grating created by an acoustic wave ($\Omega$, Kac). The optical wave is therefore considered to interfere with the acoustic wave. A spectral component of the output signal has the waveform:

$$S_d(\omega_d)e^{i(\omega_d t - k_d x)} = S_i(\omega_i)e^{i(\omega_i t - k_i x)} S_{ac}(\Omega) e^{i(\Omega t - k_{ac} x)} \quad (7)$$

with the Bragg diffraction conditions:

$\omega_d = \omega_i + \Omega$ $k_d = k_i + K_{ac}$ $S_d(\omega_d) = S_i(\omega_i) \times S_{ac}(\Omega)$ It follows that the output signal is the convolution:

$$S_d\left(t - \frac{n_d x}{c}\right) = S_i\left(t - \frac{n_i x}{c}\right) \otimes S_{ac}\left(t - \frac{x}{V_{ac}}\right) \quad (8)$$

In the above, the acoustic wave and the input optical wave are considered to be colinear in the acoustooptic medium. However, these waves could also be non-colinear. The above formulae would be valid by considering formulae in vector form.

Figure 4A:
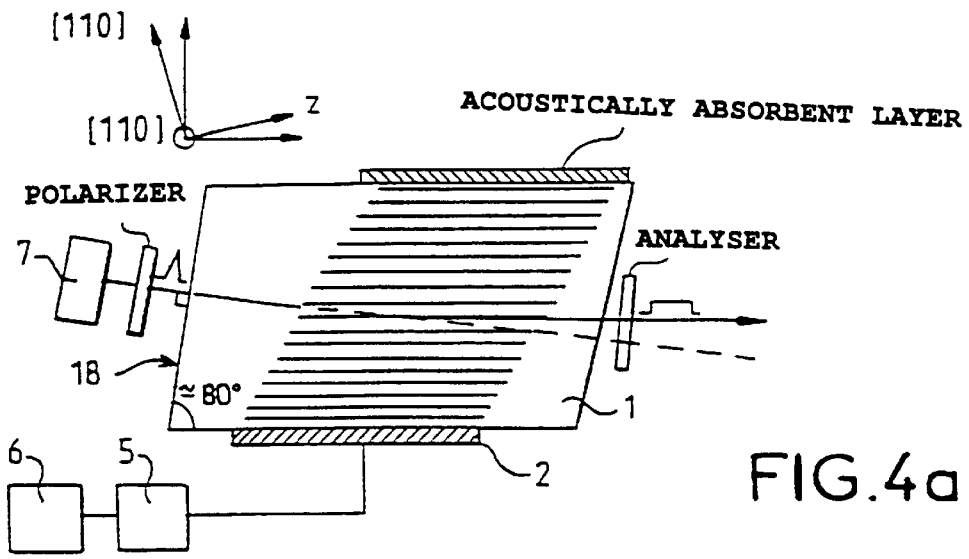

FIG. 4a shows an illustrative embodiment of a device according to the invention in which the optical and acoustic waves are not colinear.

The acoustooptic transducer is, for example, of the type described in the document. "Acousto-Optic Tunable Filters" by I. C. Chang, published in Acousto-Optic Signal Processing, pages 147–148 by Norman J. Berg—Maryland. It has an acoustooptic transducer 1 with a piezoelectric transducer 2 allowing an index grating to be induced. The acoustooptic transducer 1 is, for example, a TeO$_2$ crystal and is oriented as indicated in FIG. 4a. The direction of propagation of the optical wave is suitably oriented with respect to the acoustic wave so that there is interaction with the index grating. The entrance face 18 is suitably inclined for the entry of the optical wave.

Illustrative embodiments will now be described in which provision is made for the optical and acoustic waves to be colinear or almost colinear.

The material used for the acoustooptic transducer is a uniaxial material such as LiNbO$_3$ or CaMoO$_4$, or even TeO$_2$. By way of example, let us take as the material lithium niobate LiNbO$_3$, as propagation axis the y axis of the lithium niobate, the C axis being along the z axis. Let us couple a transverse acoustic wave of velocity=v=4000 in/sec, polarized along the x axis of the lithium niobate, with an incident optical wave polarized along the z (or c) axis, for which the optical index is the extraordinary index $n_1 = n_e = 2.20$. Under these Conditions, the diffracted optical wave will be a wave polarized along the x axis for which the optical index is the ordinary index $n_2 = n_o$ 2.29.

For an optical wavelength in vacuo of $\lambda_0 = 0.8\mu$, i.e. an optical frequency $f_0 = 375$ THz, the frequency of the transverse acoustic wave must therefore be:

$$f_{ac} = \frac{v}{c}|n_e - n_o| \cdot f_0 = \frac{4 \cdot 10^3}{3 \cdot 10^3} \cdot 0.09 \cdot 3.75 \cdot 10^{14} = 450 \text{ MHz} \quad (9)$$

If the short optical pulse has a duration of 20 fsec and covers a bandwidth of $B_{opt} = 0.5 \cdot 10^{14}$ Hz, the acoustic bandwidth must be:

$$B_{ac} = \frac{v}{c}|n_e - n_o|B_{opt} = 60 \text{ MHz} \quad (10)$$

In order to expand this short pulse 1000 times in order to extend it to 20 psec the duration $T_{ac}$ of the acoustic pulse must be:

$$T_{ac} = \frac{c}{v|n_e - n_o|} \cdot T_{opt} = 16.7 \text{ } \mu\text{sec} \quad (11)$$

and the length of the lithium niobate crystal must be:

$$L_{ac} = v \cdot T_{ac} = 66.8 \text{ mm}. \quad (12)$$

When a long pulse of duration T is frequency-modulated linearly over a band B, one particular frequency of the spectrum B occupies a duration $T_f$:

$$T_f = \frac{T}{\sqrt{BT}} = \sqrt{\frac{T}{B}} \quad (13)$$

For complete conversion of the incident optical wave to the diffracted optical wave (100% conversion yield), the coupling length $L_o$ must be equal to the length occupied in the crystal by a particular frequency $f_{ac}$ in the band $B_{ac}$, i.e.:

$$L_o = \frac{\pi}{2|\kappa|} = v\sqrt{\frac{T_{ac}}{B_{ac}}} = \frac{c}{|n_2 - n_1|} \cdot \sqrt{\frac{T_{opt}}{B_{opt}}} \quad (14)$$

i.e., again, taking into account equations (4):

$$|\kappa|^2 = \frac{\omega^2}{8c^2}(n_1 n_2)^3 p^2 \frac{I_{ac}}{\rho v^3} = \frac{\pi^2}{4v^2} \cdot \frac{B_{ac}}{T_{ac}} \quad (15)$$

Letting, as usual, $$M_2 = \frac{(n_1 n_2)^3 p^2}{\rho v^3} \quad (16)$$

the acoustic intensity necessary for total transfer of the energy of the incident wave to the diffracted wave may therefore be expressed as:

$$I_{ac} = \frac{1}{2}\rho v \cdot \frac{\lambda_o^2}{(n_1 n_2)^3 \cdot p^2} \cdot \frac{B_{ac}}{T_{ac}} = \frac{\lambda_o^2}{2 M_2 L_o^2} \quad (17)$$

In the particular case of lithium niobate in our example:

$\rho = 4.64 \cdot 10^3$ kg/m$^3$, $p = 0.151$ and $M_2 = 9.82 \cdot 10^{-15}$ sec$^3$/kg, i.e.:$I_{ac} = 7.3$ W/mm$^2$ with $L_o = 2.1$ mm. (18)

Various illustrative embodiments of acousto-optic devices according to the invention will now be described with reference to FIGS. 4a to 4d.

Figure 4B:
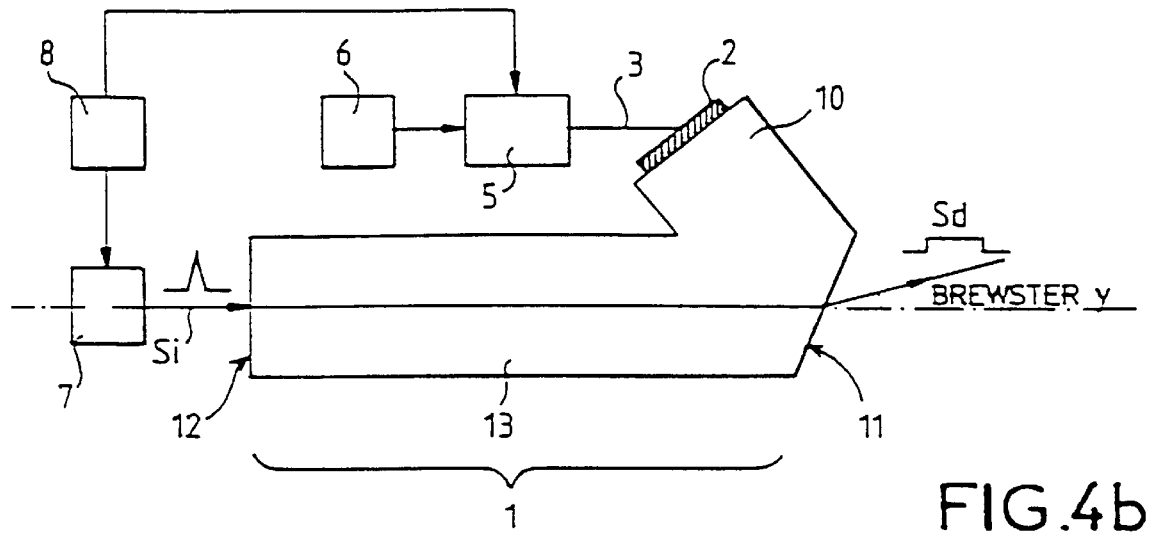

The device shown in FIG. 4b has a crystal 1 which comprises a part 13 provided for propagating the optical wave. A part 10 inclined with respect to the part 13 is used to generate an acoustic wave in the device by means of a piezoelectric device 2 driven by the circuits 5 and 6. The acoustic wave generated is reflected by an inclined face 11 towards the part 13 along the direction of propagation of the optical wave. The incident optical wave $S_i$ is coupled in the medium 13 via a face 12 along a suitably chosen direction in the crystal 1.

For example, as described previously, in the case of LiNbO$_3$, this direction is colinear with the y axis of the crystal. The inclination of the face 11 is chosen so that the diffracted optical wave $S_d$ exits at Brewster incidence.

The acoustic wave is generated in the elastooptic medium by an acoustic transducer 2 driven, as mentioned previously, by a modulator 5 controlled by a programmable circuit 6.

In addition, it is necessary for the emission of the incident light pulse Si to be synchronized with the acoustic wave in the acoustic medium 13. To do this, the light pulse $S_i$ is delivered by the source 7, the emission of which is controlled by a synchronization circuit 8 which also controls the operation of the modulator 5.

Figure 4C:
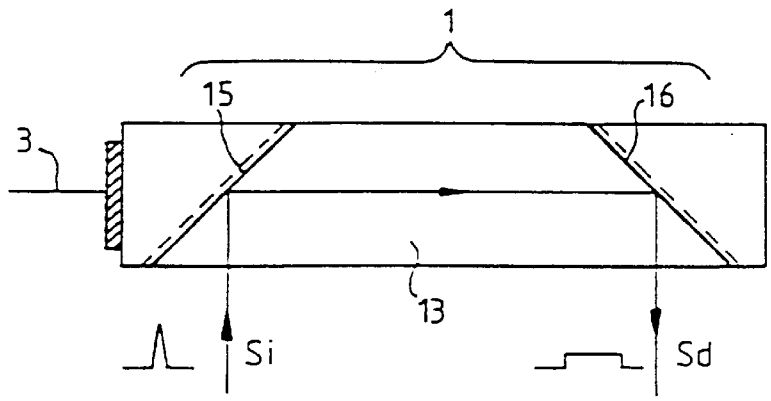

FIG. 4c shows a device in which means are provided for reflecting the optical wave $S_i$ along the direction of propagation of the acoustic wave.

The acoustic wave is generated in the part 13 of the crystal along a previously chosen axis of the crystal. Along this axis are provided mirrors 15 and 16 which allow the acoustic wave to propagate and which, oriented at an angle (at 45°, for example), allow the incident optical wave $S_i$ to enter and the diffracted optical wave to exit. These mirrors 15, 16 are, for example, layers of optical dielectric materials. They may be made in the form of multilayers (for example SiO/ZnO, $SiO_2/ZnO_2$) or of a thin layer of ITO. In order to produce such a device, an element 1 is cut obliquely and the dielectric multilayer is deposited on the cut face of the element 13 and then the two cut elements are cemented together in order to reconstitute the element 1. The thickness of the reflection layers 15, 16 must be very small compared to the acoustic wavelength.

Figure 4D:
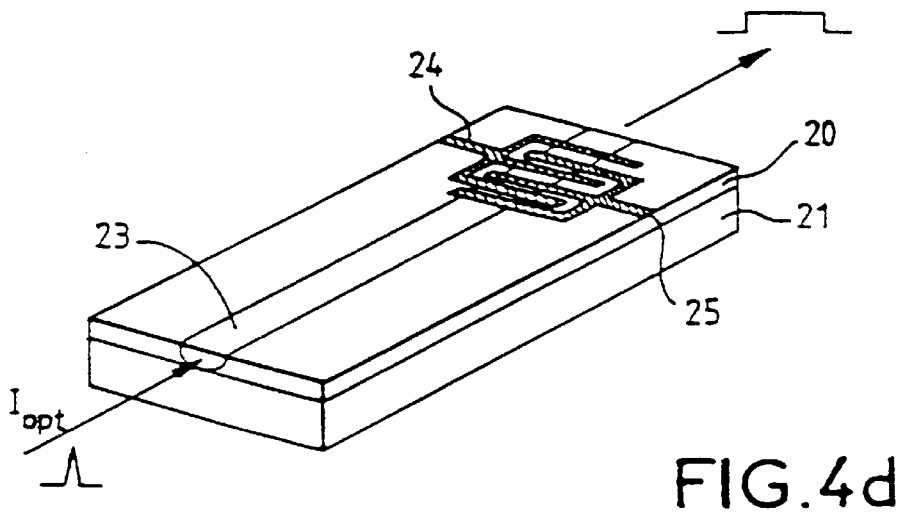
Figure 4E:
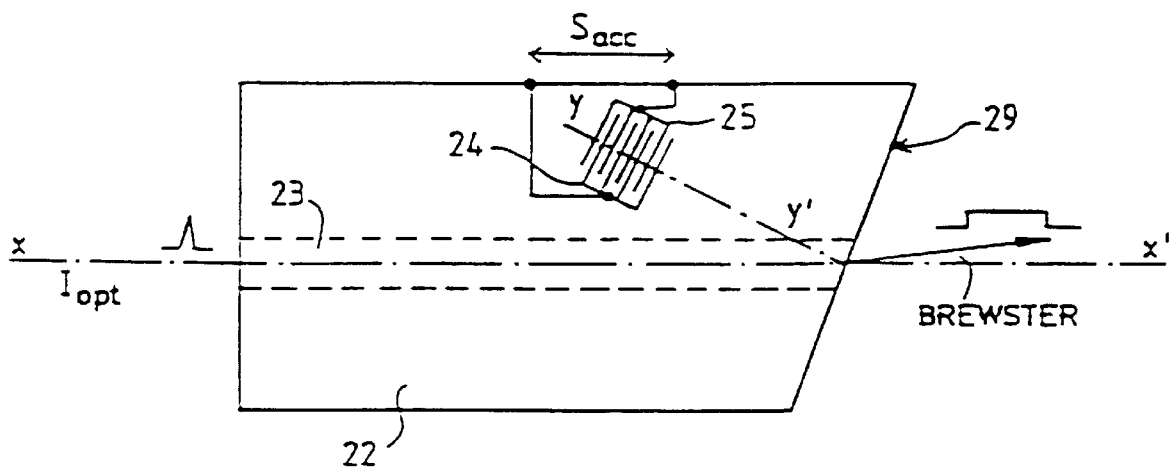

FIGS. 4d, 4e show illustrative embodiments of the acoustooptic device using the techniques of integrated optics.

An optical guide 23 is produced in a layer 20 of material ($LiNBO_3$) having acoustic-wave propagation properties. Interdigitated electrodes 24, 25 are provided on the surface of the layer 20 (in this case, the layer 20 is also piezoelectric).

In FIG. 4e, one face 29 of the device is inclined with respect to the axis of the electrodes 24, 25 in order to reflect the acoustic wave colinearly with respect to the axis of the optical guide 23.

In the above, it is possible to provide, at the exit of the acoustic wave, means for absorbing the acoustic wave (absorbent layers).

The invention is applied to the amplification of light pulses in order to generate ulrashort light pulses. In particular, it is desired to control the duration of the pulse. This is because the formation of an ultrashort light pulse of high peak power comes up against the limits of the optical amplifier. The invention therefore makes provision for the device of the invention to be applied in a system of the type shown in FIG. 5a. This system includes an oscillator delivering ultrashort pulses which are expanded by the expansion device EXP. The expanded pulses are then amplified by passing once or several times through laser amplifiers (AMP) which are flash-pumped or diode-pumped. Next, the ultrashort pulses are generated by conventional compression means COMP using pairs of dispersive gratings, for example. The advantage of the invention stems from the possibility of programming the expansion of the pulse by the expansion device in order to be able to compensate for the dispersion effects due to the amplifying media and for compression grating dispersion defects. The invention therefore makes the operation of the expansion device programmable so as to program the expansion of the various frequencies contained in the light pulses.

One embodiment of the invention consists in providing, in the amplification chain of the source, a programmable acoustooptic device, such as the one described above as shown in FIG. 5a, an acoustooptic device 1 is associated with a conventional expansion device EXP of the dispersive grating type.

An optical oscillator OSC therefore delivers optical pulses $I_{opt}$ of short duration, for example 20 fs, to an acoustooptic device 1 which is a device of the type described above. The optical pulse delivered by the device 1 is transmitted to an expansion device EXP which converts the pulse $I_{opt}$ into a signal of longer duration but of lower intensity. This signal is amplified by an amplifier AMP and the amplified optical signal is compressed in order to give a pulse of short duration and large amplitude. In this mode of operation, the device of the invention makes it possible to correct all the dispersion defects due respectively to the expansion device, to the amplifiers and to the compression device. This is achieved by programming the acoustooptic device, as described previously.

As shown in FIGS. 5a and 5b, an adaptive loop is also provided between the output of the amplification chain and the modulation control of the acoustooptic device 1. This loop makes it possible to measure the output pulse and to vary the modulation control (the control circuit 8 shown in FIG. 4a by means of a processing circuit C and using a convergence algorithm.

In some applications, it is possible to provide, for expanding the pulses, only the acousto-optic device 1 and not to provide a conventional expansion device, as shown in FIG. 5b.

Another laser architecture integrating a programmable device is shown in FIG. 6. By way of example, it uses a cavity in which the acoustooptic device serves to compensate for the dispersion effects due to the amplifying medium, optical components and mirrors constituting the laser cavity.

According to the invention, an acoustooptic device, the acoustic signal of which is programmed in order to compensate for the distortions, is therefore placed in the cavity. In particular, the modulation of the acoustic signal is organized in consequence of the frequency distortions of all the optical components of the cavity. Under these conditions, an ultrashort pulse diffraction-limited temporally may be obtained in the exit beam of this laser architecture.

What is claimed is:

1. A programmable acoustooptic device comprising:
   an elastooptic medium configured to receive an input optical pulse and an acoustic wave;
   an acoustic transducer configured to generate said acoustic wave in the elastooptic medium along a defined direction; and
   a programmable circuit coupled to said acoustic transducer and configured to program at least one of a frequency modulation and phase modulation of the acoustic wave, whereby said acoustic transducer generates a modulated acoustic wave,
   wherein an output optical pulse is generated, said output optical pulse being a convolution of the input optical pulse with the modulated acoustic signal.

2. The device according to claim 1, wherein the acoustic wave and the input optical wave are essentially colinear.

3. The device according to claim 1, wherein the acoustic wave and the input optical wave are not colinear.

4. The device according to claim 1, wherein the programmable circuit is configured to create a continuity of coexisting gratings of different spacings in the elastooptic medium.

5. The device according to claim 1, wherein said acoustic transducer is configured to generate the acoustic wave in a direction colinear to a direction of propagation of the input optical pulse and along an axis of the elastooptic medium in which an index grating causes a conversion (TE, TM) of a mode of polarization of the input optical pulse.

6. The device according to claim 1, further comprising:
   an optical source configured to deliver the input optical pulse;
   a modulation circuit configured to control the modulation of the acoustic wave under the control of the programmable circuit; and a synchronization circuit configured to synchronize the optical source and the modulation circuit.

7. The device according to claim 1, wherein the elastooptic medium includes:
   a first part for colinear propagation of the input optical pulse and of the acoustic wave; and
   a second part at an angle with the first part;
   wherein a junction between the first and second parts has a face configured to reflect the acoustic wave from the second part to the first part.

8. The device according to claim 7, wherein said face is at an angle with a direction of propagation of the input optical pulse in the elastooptic medium such that the output optical pulse exits the elastooptic medium at Brewster incidence.

9. The device according to claim 1, wherein the elastooptic medium includes, along a direction of propagation of the acoustic wave, at least one optical mirror at an angle with said direction of propagation of the acoustic wave, said at least one optical mirror being configured to receive the input optical pulse and configured to allow the input optical pulse to be colinearly coupled with the acoustic wave in the elastooptic medium.

10. The device according to claim 1, further comprising:
    an optical guide configured to guide said input optical pulse into said elastooptic medium, wherein
        said elastooptic medium comprises a layer of a crystalline material having acoustooptic properties and formed on a substrate,
        said acoustic generator is configured to generate said acoustic wave in said layer of crystalline material colinearly with the optical guide.

11. The device according to claim 10, wherein the acoustic generator includes interdigitated electrodes located above the optical guide.

12. The device according to claim 11, wherein the layer of crystalline material has a face inclined with respect to an axis of the optical guide, and
    said interdigitated electrodes are configured to generate an acoustic wave in the layer of crystalline material towards said face which reflects the acoustic wave colinearly with respect to the optical guide.

13. A laser source comprising:
    an acoustooptic device configured to receive an acoustic wave and a polarized incident optical pulse and configured to deliver an expanded optical pulse, said acoustooptic device comprising:
        an acoustic transducer configured to generate said acoustic wave in an elastooptic medium, and
        a programmable circuit coupled to said acoustic transducer and configured to program at least one of a frequency modulation and phase modulation of the acoustic wave, whereby said acoustic transducer generates a modulated acoustic wave,
        wherein said expanded optical pulse is a convolution of said polarized incident optical pulse with said modulated acoustic wave;
    an optical amplifier configured to amplify the expanded optical pulse; and
    an optical compression device configured to compress the expanded and amplified optical pulse.

14. The laser source according to claim 13, further comprising an expansion device located between the acoustooptic device and the optical amplifier or located upstream of the acoustooptic device.

15. The laser source according to claim 13, wherein the programmable circuit is configured to compensate for amplification distortions.

16. The laser source according to claim 13, further comprising an adaptive loop circuit configured to measure optical pulses delivered by the optical compression device and configured to communicate with a modulation circuit so as to adjust said at least one of the frequency modulation and phase modulation programmed by said programmable circuit.

17. A cavity oscillator device comprising:
    an optical cavity configured to allow a light wave to follow a closed path;
    a light source configured to emit a light wave in said closed path; and
    an acoustooptic device in the optical cavity, said acoustooptic device being configured to deliver an output light wave and comprising:
        an elastooptic medium configured to receive an acoustic wave and said light wave emitted by said light source,
        an acoustic transducer configured to generate said acoustic wave in said elastooptic medium, and
        a programmable circuit coupled to said acoustic transducer and configured to program at least one of a frequency modulation and phase modulation of the acoustic wave, whereby said acoustic transducer generates a modulated acoustic wave,
        wherein said output light wave is a convolution of said light wave received by said elastooptic medium with said modulated acoustic wave.

18. The cavity oscillator device according to claim 17, wherein the programmable circuit is configured to compensate for at least one of phase distortions and frequency distortions in the optical cavity.

* * * * *